United States Patent [19]

Scheer et al.

[11] 4,445,178

[45] Apr. 24, 1984

[54] FISHING AID APPARATUS AND METHOD

[76] Inventors: Harold L. Scheer, 7216 Shoreline Dr.; Tom L. Jenkins, 6484 Sterling Dr., both of Oklahoma City, Okla. 73132; Robert M. Kimmell, 3529 NW. 19th, Oklahoma City, Okla. 73107; Michael E. Holloway, 1822 Wind Hill Ave., Edmond, Okla. 73034

[21] Appl. No.: 293,852

[22] Filed: Aug. 18, 1981

[51] Int. Cl.³ ............................................. G06F 15/20
[52] U.S. Cl. .................................... 364/400; 364/715; 43/4; 43/4.5
[58] Field of Search ....................... 364/400, 709, 715; 43/4, 4.5

[56] References Cited

U.S. PATENT DOCUMENTS

| | | | |
|---|---|---|---|
| 2,532,061 | 11/1950 | Glick | 43/4 |
| 3,365,818 | 1/1968 | Greiner | 43/4 |
| 3,786,586 | 1/1974 | Swan | 43/4 |
| 3,897,157 | 7/1975 | McLaughlin et al. | 43/4 |
| 4,218,755 | 8/1980 | Root | 364/715 |

Primary Examiner—Gary Chin
Attorney, Agent, or Firm—E. Harrison Gilbert, III

[57] ABSTRACT

To determine a desirable type of bait, size of bait, size of fishing line, retrieval speed of the line, color of the bait and the general conditions for fishing, the present invention includes a microcomputer which responds to electrical input signals provided through data entry keys representing specific values or ranges of the environmental conditions of season, surface temperature, water depth, time of day, structure, cove location, cover, water clarity, and wind speed. The specific nature of the general environmental conditions are entered through the data entry keys. This input information is utilized by the microcomputer to select desirable types of baits from a data base of lures contained within the present invention. Different ones of the input conditions are utilized to determine the other preferable types and uses of fishing equipment.

22 Claims, 8 Drawing Figures

FISHING AID APPARATUS AND METHOD

BACKGROUND OF THE INVENTION

This invention relates generally to apparatus and methods for determining desirable types and uses of fishing equipment for catching fish and more particularly, but not by way of limitation, to apparatus and methods for determining on the basis of a plurality of environmental conditions a desirable bait, a desirable bait size, a desirable shade of bait color, a desirable fishing line size and a desirable fishing line retrieval speed which are to be utilized by a person in attempting to catch bass.

Because fish are known to be attracted to various types of bait, sizes of bait, colors of bait and speeds with which the bait is moved through the water, a fisherman can improve his or her chances of catching a particular type of fish if the fisherman can determine specific types, sizes, colors and speeds which are attractive to the specific type of fish he or she is attempting to catch. This determination is difficult because the desirable types, sizes, colors and speeds vary among the different types of fish. Variations in these factors also occur because of variable environmental conditions associated with the habitats of the fish.

Additionally important in catching fish is the size of line which is to be used to catch a particular fish in a particular habitat. This is important because, for example, if a line which is too small is utilized, the line may snap and the fish lost.

Therefore, there is the need for an apparatus and a method for relatively quickly determining a desirable type of bait, size of bait, color of bait, size of line and speed of retrieval of the bait and line for a particular type of fish in a particular habitat having particular environmental conditions associated therewith. Such apparatus and method are particularly important to persons who fish for bass because of the number of bass fisherman, the wide range of environmental conditions in which bass fishing occurs, and the competition which can exist among bass fishermen.

Certain devices to assist fishermen have been disclosed. U.S. Pat. No. 2,532,061 in the name of Glick discloses a mechanical fishing guide which is intended to be used to compute the likely qualities of fishing. The quality determination is based upon the environmental factors of weather, wind direction, stream status (water), barometric pressure, and calendar date. By manipulating the Glick device, the user of the device obtains numbers which are added and compared to a chart to determine the anticipated quality of fishing.

U.S. Pat. No. 3,365,818 in the name of Greiner and U.S. Pat. No. 3,897,157 in the name of McLaughlin et al. disclose devices for determining a suitable color or colors for a lure. The Greiner apparatus is a mechanical device whereas the McLaughlin apparatus is an electronic device.

U.S. Pat. No. 3,786,586 in the name of Swan discloses a chart for computing the depth to which a line should be lowered for trolling purposes.

Although these devices may be useful for the purposes disclosed in the patents, they do not provide apparatus or methods by which a type of bait, a size of bait, a color of bait, a size of line or a speed of retrieval of the line and bait can be automatically determined upon the selection of a plurality of environmental conditions in which the fishing is to occur. More particularly, these devices disclosed in the aforementioned patents do not provide this information specifically with respect to bass. Furthermore, these devices provide information on the basis of a relatively limited number of input parameters.

SUMMARY OF THE INVENTION

The present invention overcomes the above-noted and other shortcomings of the prior art by providing a novel and improved fishing aid apparatus and method. This invention utilizes inputs representing a number of environmental conditions and provides an output specifying a desirable type of bait, a desirable size of bait, a desirable shade of color of bait, a desirable fishing line size, and a desirable speed of retrieval of the line and bait. The present invention also provides an output specifying the general fishing conditions indicated by the specified environmental conditions.

Broadly, the present invention comprises a housing having a tabular element disposed thereon. The tubular element includes a plurality of columns of indicia defining a plurality of environmental conditions associated with, in the preferred embodiment, large-mouth bass fishing. The indicia contained within the tabular element are also arrayed in rows within the plurality of columns so that the indicia in each row define specific ranges within a respective one of the plurality of environmental conditions.

The present invention also includes a data entry element for providing electrical signals designating selected portions of the indicia. In the preferred embodiment the data entry element includes a switch element equal in number to the plurality of columns so that each switch element is associated with a respective one of the columns of indicia.

The present invention also includes an electronic computer element for automatically determining a desirable type and use of fishing equipment in response to the electrical signals from the data entry element. The computer element is disposed in the housing.

The present invention still further includes a display element for communicating the desirable type and use of fishing equipment determined by the electronic computer element. The display element includes a portion for specifying a preferred bait or lure, a portion for specifying a preferred bait or lure size, a portion for specifying a preferred shade of bait or lure color, a portion for specifying a preferred fishing line size, and a portion for specifying a preferred line retrieval speed. The display element also includes a portion for specifying the general fishing conditions.

The method of the present invention broadly includes defining a plurality of environmental identifiers for a plurality of environmental conditions forming criteria for selecting a type of bait. The method also includes assigning a respective numerical value to each bait within a data base of bait for a respective environmental identifier. The method further includes selecting a respective environmental identifier for each environmental condition and accumulating for each bait the numerical values assigned to that bait for the respective environmental identifier selected. From the accumulating step, the method then includes determining which bait has the desirable or optimum accumulated value and communicating the bait determined to have the desirable or optimum accumulated value.

From the foregoing, it is a general object of the present invention to provide a novel and improved fishing aid apparatus and method. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
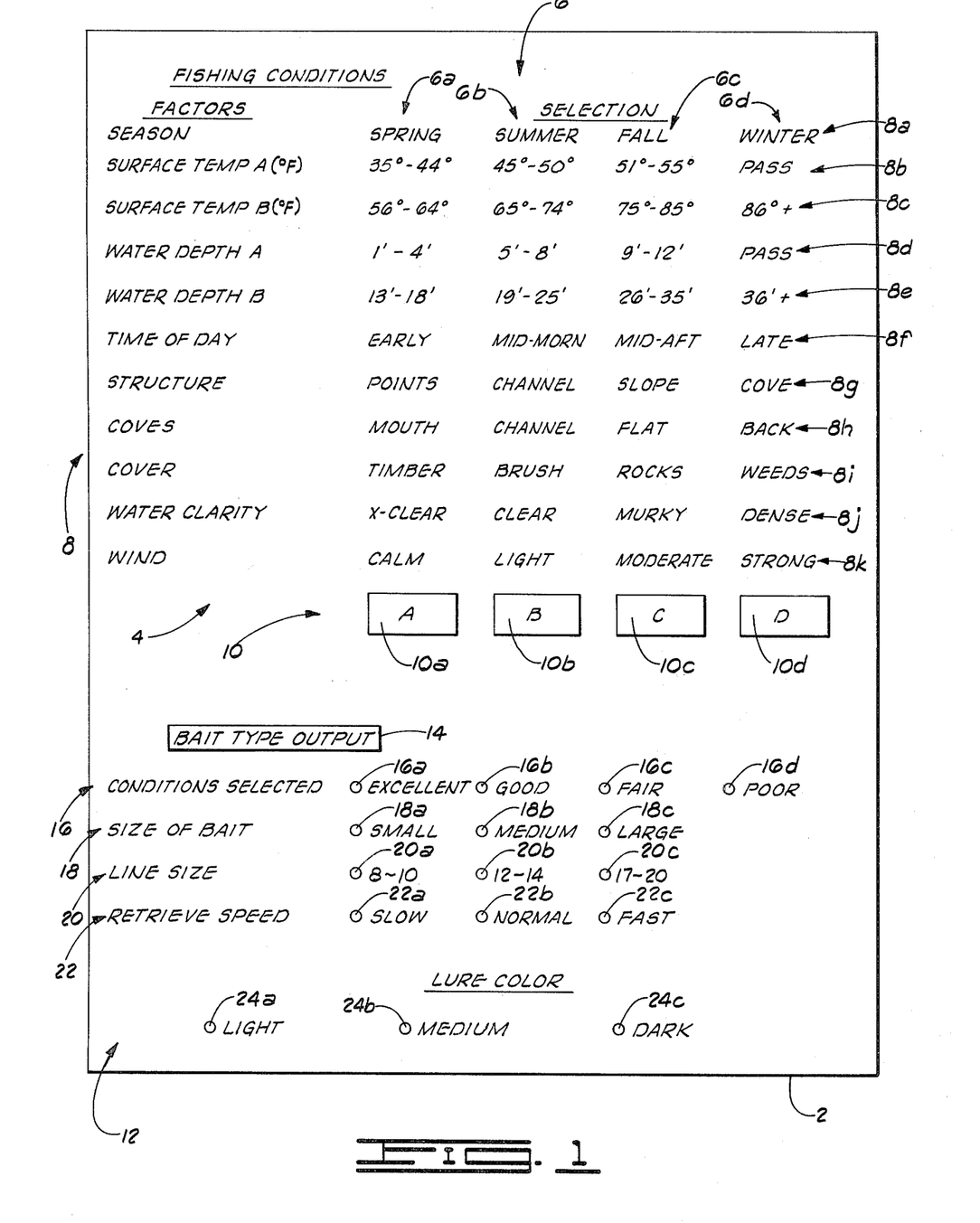
FIG. 1 is a top plan view of the outer portion of the preferred embodiment apparatus of the present invention.

With reference to the drawings a preferred embodiment of the present invention will be described. FIG. 1 discloses that an apparatus constructed in accordance with the present invention includes a housing 2 made of a suitable substance which can be formed into a substantially fluid-tight enclosure for the electronic components subsequently described hereinbelow. The housing 2 is preferably made substantially fluid-tight because it is contemplated that the present invention be mountable in a boat or other water vessel for use by a fisherman at the specific location at which fishing is to be conducted.

Contained on the housing 2 is a suitable element for specifying a plurality of general environmental conditions which affect fish habitats. Each of the general environmental conditions is defined to include a plurality of specific environmental identifiers. In the preferred embodiment this element includes a tabular element 4 including a plurality of columns 6 of indicia. The indicia are specific environmental identifiers defining a plurality of environmental conditions associated with fishing in general and with large-mouth bass fishing in the specific embodiment described herein. In the preferred embodiment the plurality of columns 6 include four columns identified in FIG. 1 by the reference numerals 6a, 6b, 6c, and 6d.

The indicia contained in columns 6a-6d are specifically shown to define the nine general environmental conditions of season in which the fishing is to occur, surface temperature of the body of water in which the fishing is to occur, the water depth at which the fishing is to occur, the time or portion of the day during which the fishing is to occur, the structure in the body of water where the fishing is to occur, the location in a cove if the fishing is to occur in a cove, the cover associated with the body of water where the fishing is to occur, the clarity of the water, and the speed of the wind where the fishing is to occur. The indicia in the columns 6 have been selected in the specific terms set forth in FIG. 1 by the inventors of the present invention because it has been determined by the inventors that these specific environmental identifiers of the general environmental conditions are associated with different characteristics of the fish (i.e., bass in the preferred embodiment) to be caught. In other words, for each of the different identifiers contained in the columns 6, the fish are believed to act differently so that a different evaluation must be made for each identifier contained in the tabular element 4.

In addition to being arrayed in the columns 6, the indicia are arrayed in a plurality of rows 8 so that the indicia in each row define specific ranges within a respective one of the plurality of environmental conditions. In the preferred embodiment the rows 8 includes rows 8a-8k. Rows 8a and 8f-8k each has a respective general environmental condition associated therewith as shown in FIG. 1. Within each of the general conditions of rows 8a and 8f-8k there are four specific environmental identifiers also as shown in FIG. 1. Rows 8b and 8c contain the surface temperature indicia which are divided into the seven temperature ranges shown in FIG. 1. Rows 8d and 8e contain the seven depth ranges of the water depth environmental condition.

The indicia of the tabular element are clearly described in FIG. 1. It is to be noted that "MID-MORN" identifies a mid-morning period, "MID-AFT" identifies a mid-afternoon period, and "X-CLEAR" identifies an extra clear water condition. The specific ranges and values set forth in the tabular element 4 have been determined by the inventors on the basis of their studies of bass and the effects thereon of the listed environmental conditions. These effects can be classified according to the ranges and values specified in FIG. 1. For example, the spawning temperature of large-mouth bass is within the range of 65° F. to 74° F.

To enable a person using the present invention to select the specific environmental identifiers contained in the tabular element 4 and to enter them into the present invention, the present invention includes a data entry element comprising a plurality of identifier selector elements 10. The identifier selector elements 10 includes in the preferred embodiment four switches respectively actuated by a first key 10a, a second key 10, a third key 10c, and a fourth key 10d. The switches and keys are suitably mounted in the housing 2.

The data entry element is used for selecting one of the specific environmental identifiers for each of the general environmental conditions defined by the indicia of the tabular element 4. More particularly, the plurality of selector element 10 provides electrical signals designating selected portions of the indicia contained in the tabular element 4. In the preferred embodiment, the number of selector element 10 is equal in number to the plurality of columns 6 so that each switch and key 10a-10d is associated with a respective one of the columns 6a-6d. As shown in FIG. 1, each of the keys 10a-10d is specifically co-located with the respective column with which it is associated. In other words, the key 10a is located at the bottom of the column 6a, the key 10b is located at the bottom of the column 6b, the key 10c is located at the bottom of the column 6c, and the key 10d is located at the bottom of the column 6d. This permits easy utilization of the present invention during the operation thereof as will become apparent hereinbelow.

Further shown in FIG. 1 is a communication element 12 for communicating the desired fishing equipment and utilization thereof which is determined by the present invention as subsequently described. The communication element 12 includes in the preferred embodiment a display portion for displaying, and thereby communicating, the output to a person using the present invention. The display includes a portion for specifying a preferred type of bait. This portion is identified in FIG. 1 by the reference numeral 14 and can be any suitable type of display, such as an alphanumeric liquid crystal display.

The communication element 12 also includes a portion for specifying the relative nature of the selected environmental conditions. This portion is identified in FIG. 1 by the reference numeral 16 and is labeled "conditions selected." In the preferred embodiment this display includes a plurality of light-emitting diodes 16a, 16b, 16c, and 16d each associated with a respective relative term to identify the general conditions selected as being excellent, good, fair or poor.

The communication element 12 also includes a portion for specifying a preferred lure size. This portion is identified by the reference numeral 18 and includes in the preferred embodiment light-emitting diodes 18a, 18b, and 18c. The size of bait is indicated by the indicia associated with the respective light-emitting diodes 18a–18c.

The communication element 12 further includes a portion for specifying a preferred fishing line size. This portion is identified by the reference numeral 20 and includes in the preferred embodiment light-emitting diodes 20a, 20b, and 20c. The specified one of the light-emitting diodes 20a–20c which is illuminated specifies the range of fishing line size that should be selected. As shown in FIG. 1 the ranges include 8–10 pound test, 12–14 pound test, and 17–20 pound test.

The communication element 12 still further includes a portion for specifying a preferred line retrieval speed. This portion is indicated in FIG. 1 by the reference numeral 22. The portion 22 includes light-emitting diodes 22a, 22b, and 22c.

Still further, the communication element 12 includes a portion for specifying a preferred shade of lure color as designated by a light-emitting diode 24a or 24b or 24c depending upon whether the present invention determines that a light, medium or dark shade of lure is desirable. Although not shown in FIG. 1, the present invention includes a respective list of suitable colors set forth below each of the shade designations of light, medium and dark. Suitable light colors include smoke, lime, white, silver, bone, chartreuse and light blue; suitable medium colors include tan, blue, brown, grape, orange, green and yellow; suitable dark colors include purple, red, black, dark blue, dark green, dark brown and dark orange. Other suitable colors can also be used.

Figure 2:
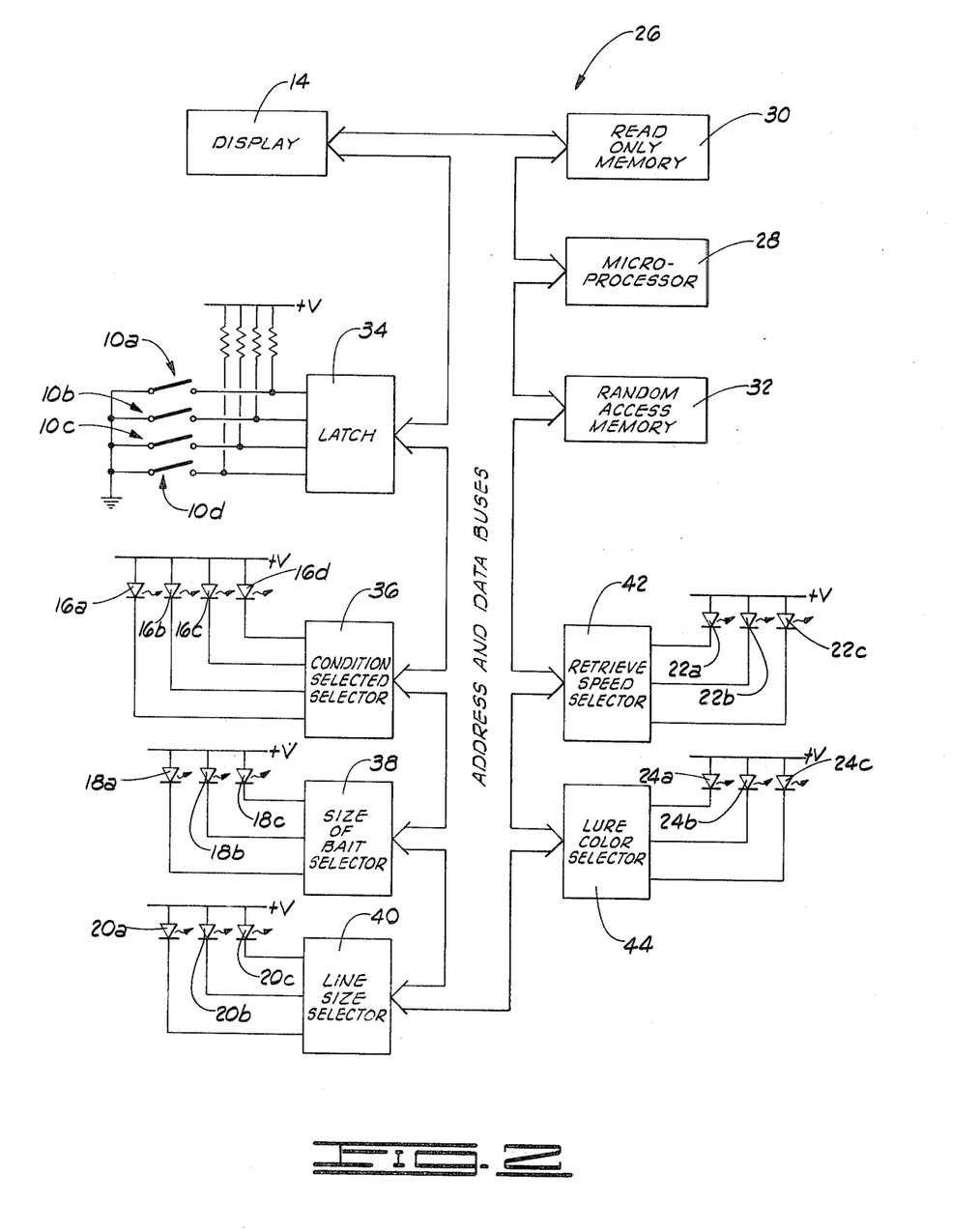
FIG. 2 is a functional block diagram of the electronic portion of the preferred embodiment apparatus of the present invention.

With reference to FIG. 2 the components of the present invention contained in the interior of the housing 2 will be described.

Within the interior of the housing 2 is an electronic computer elements which is responsive to the electrical signals from the plurality of switches 10a–10d. In response to these signals, the computer element 26 automatically determines a desirable type of fishing equipment and use thereof in the preferred embodiment. In particular, the electronic computer element 26 determines a desirable type of bait, bait color shade, bait size, line size, retrieval speed and general environmental conditions. In the preferred embodiment the bait is selected from a collection of lures. Thus, the computer elements 26 automatically determines the desirable elements based on the specific environmental identifiers contained in columns 6a–6d of the tabular element 4.

In the preferred embodiment the computer element 26 includes a portion for determining which specific environmental identifiers have been identified by the data entry element and for accumulating respective predetermined values corresponding to the entered specific environmental identifiers. This accumulation is performed for each type of bait and the other output factors to be determined and output via the communication element 12.

The computer element 26 also includes a comparison portion for comparing the accumulated values for each bait and other output factors and selecting the respective desirable element within each factor based upon the comparison.

In the preferred embodiment the computer element 26 includes a suitable microprocessor portion 28 having associated therewith an appropriate read only memory portion 30 for containing a program under which the microprocessor portion 28 operates and also having associated therewith a random access memory portion 32. These elements of the computer element 26 can be any suitable type known in the art. The microprocessor portion 28 communicates with the read only memory portion 30 and the random access memory portion 32 over suitable address and data buses as known in the art. The address and data buses are also used for communicating with the switches 10a–10d and the communication portion 12.

As shown in FIG. 2, the switches 10a–10d are connected to a suitable integrated circuit latch portion 34 which retains the on or off status of the switches 10a–10d. The computer element 26 obtains the stored status of the switches by communicating with the latch portion 34 over the address and data buses.

FIG. 2 also discloses that communication with the communication element 12 is through a plurality of output selectors 36, 38, 40, 42, and 44. The output selectors 36–44 include in the preferred embodiment integrated circuits of a suitable type to select and drive respective ones of the light-emitting diodes 16a–16d, 18a–18c, 20a–20c, 22a–22c, and 24a–24c. For example, the output selectors may include two-line-to-four-line decoder/demultiplexers of a type known in the art.

FIGS. 3A–3F disclose a flow chart which is descriptive of the program contained in the read only memory portion 30 for controlling the operation of the microprocessor portion 28. The flow chart indicates that the desired specific environmental identifier from the tabular element 4 for each general environmental condition is sequentially entered into the computer element 26. This entry is effected by depressing the respective one of the keys 10a–10d located beneath the column in which the desired specific environmental identifier is located. Such keyed sequential entry is controlled in the preferred embodiment by visual prompts given through the display 14.

Figure 3A:
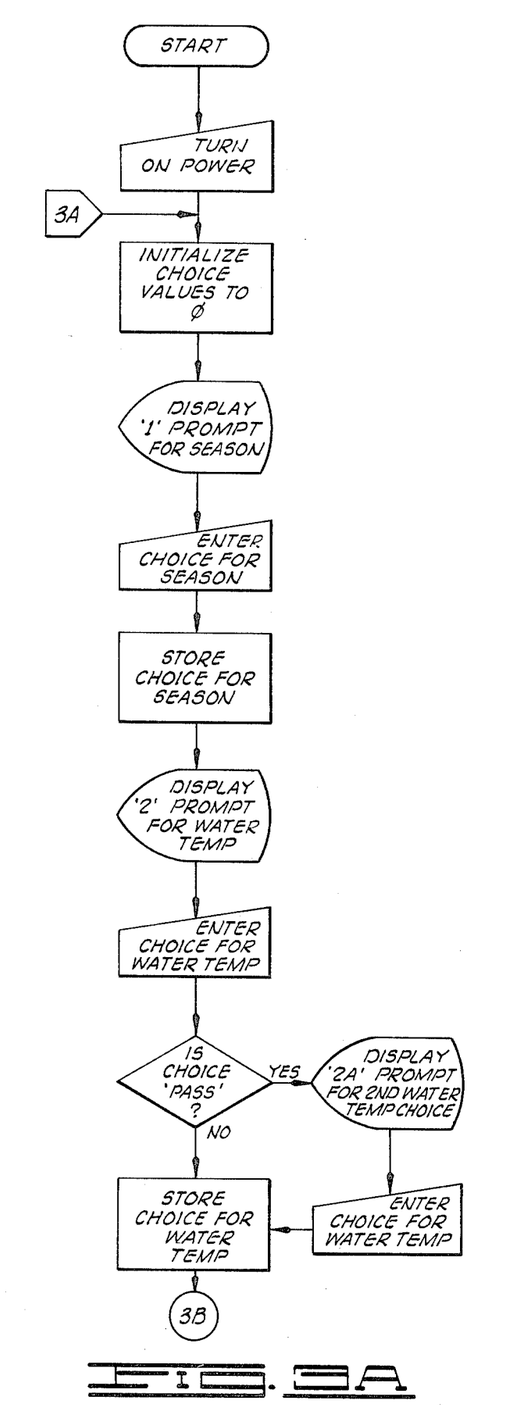
FIGS. 3A-3F include a flow chart of the preferred embodiment program utilized within the present invention.
Figure 3B:
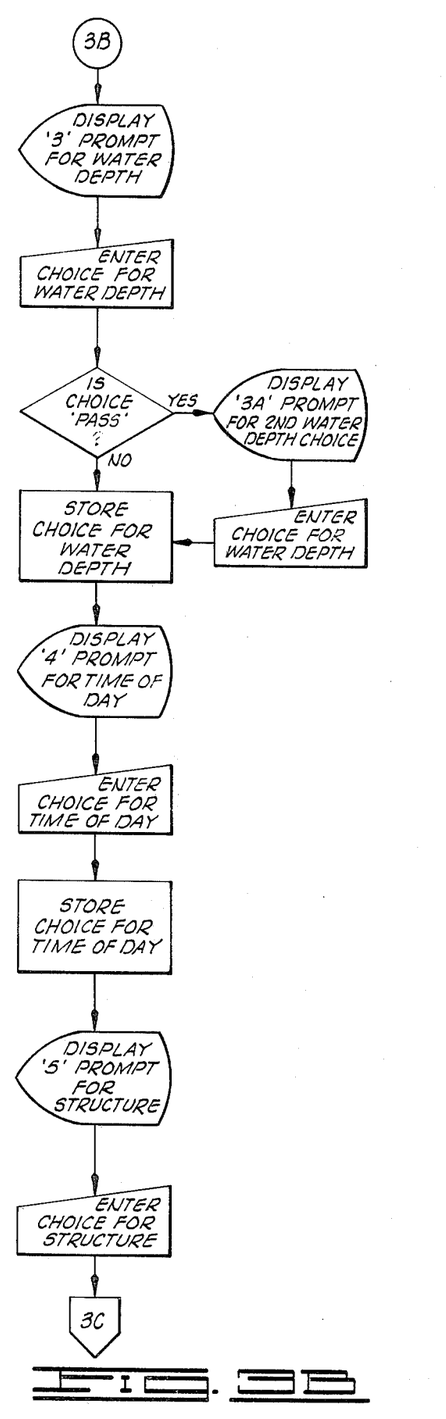
Figure 3C:
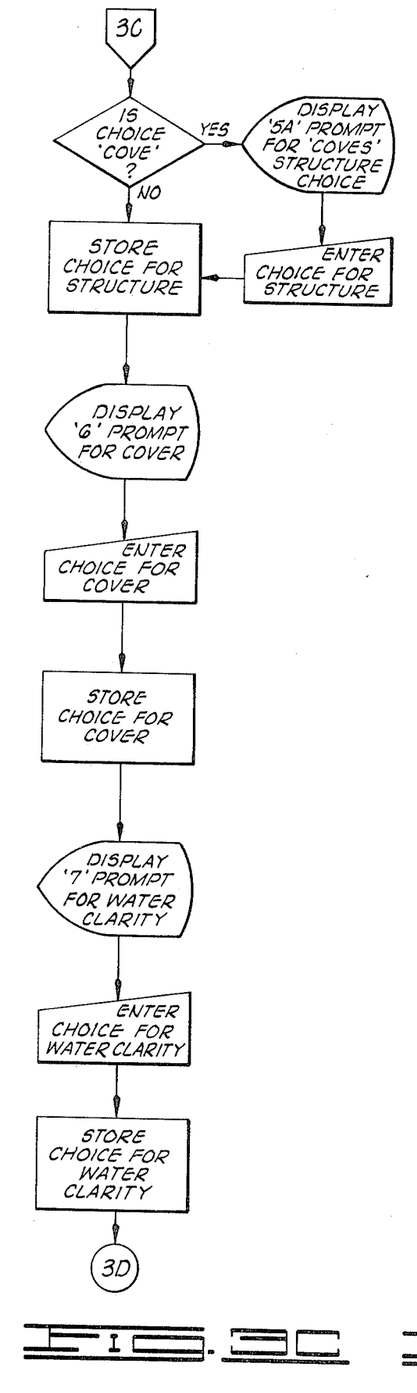
Figure 3D:
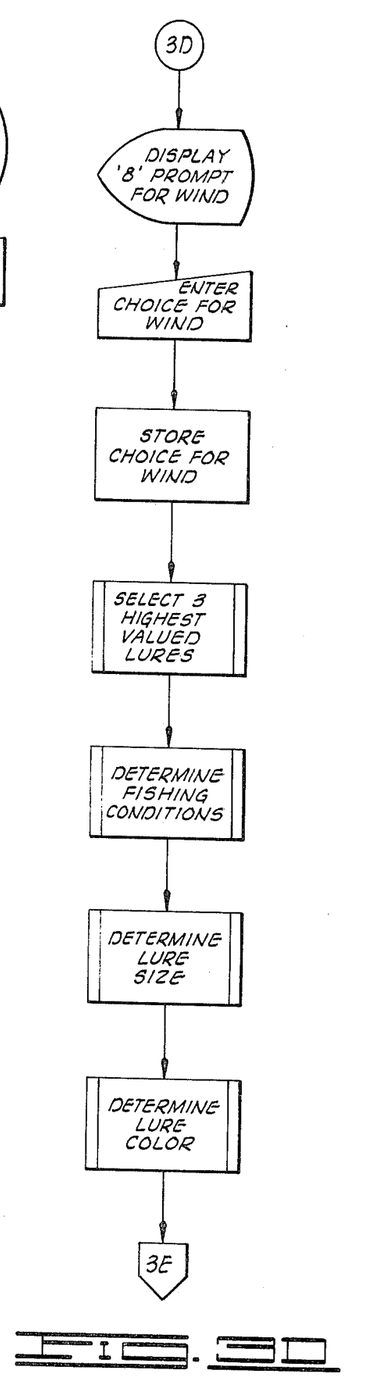
Figures 3E, 3F:
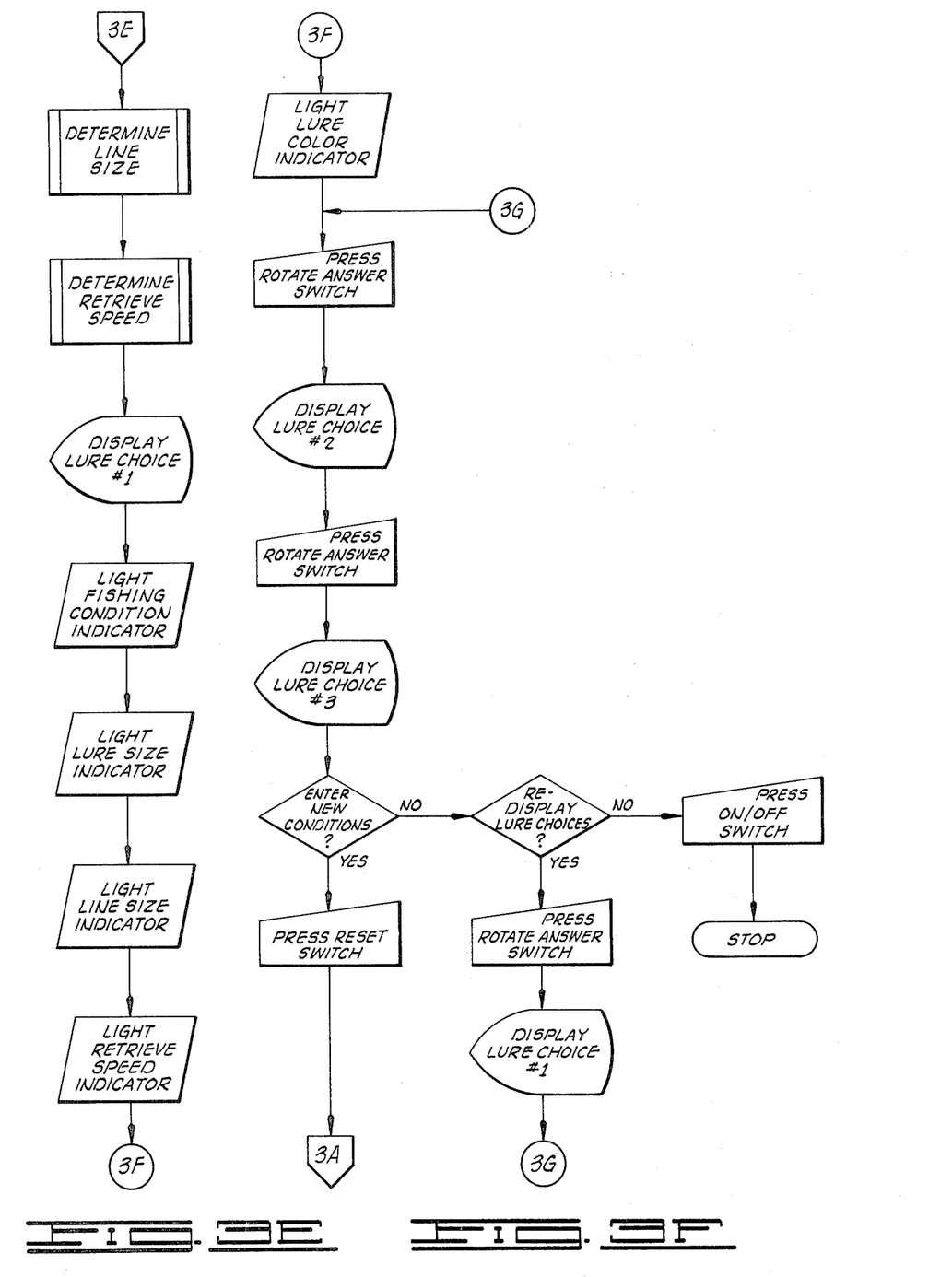

Once all the environmental identifiers have been entered and received into the computer element 26, the computer element 26 analyzes the entered data and determines the output factors as generally indicated in FIGS. 3D–3E. As mentioned hereinabove, these output factors include the desired fishing bait or lures, the general fishing condition, the lure size, the lure color shade, the line size, and the retrieval speed. Once these output factors have been determined, the appropriate displays of the communication element 12 are illuminated or otherwise actuated under control of the program shown in FIGS. 3A–3F to communicate the computed output factors to a person using the present invention.

In the preferred embodiment the computer element 26 computes three choices of lures as the preferable bait. The desirable lures are selected from a data base which contains a plurality of different types of lures and which is also stored in the read only memory portion 30. The selection of the three most desirable baits is made on the basis of environmental conditions input through the identifier selector element 10 and a respective numerical value which has been preassigned to each bait or lure for each respective environmental identifier contained within the columns 6a–6d. These preassigned numerical values are derived on the basis of the suitability of each type of bait to catch bass, in the preferred embodiment, for each respective environmental identifier. Numerical values are also preassigned to the other possible output factors and stored in the data base of the read only memory portion 30.

From this data base the computer element 26 accumulates numerical values for each bait in response to the respective environmental identifiers selected via the switches and keys 10a–10d. Once all the identifiers have been input and the values accumulated, the computer element 26 determines which bait has the desirable accumulated value. In the preferred embodiment three alternative baits are determined and communicated via the display 14 to the person utilizing the present invention. A rotate switch (not shown) is actuated to cause the computer element to sequentially display the three alternatives through the display portion 14.

In the preferred embodiment the three types of lures having the highest accumulated values are selected as being the optimum or desirable lures to be used under the selected environmental conditions. If the computer element 26 computes that two or more baits have identical accumulated values, the computer element 26 selects those baits which are top-running baits rather than deeper running baits.

To determine the desirable types of baits, the computer element 26 utilizes all the environmental condition information entered through the identifier selector element 10. Thus, the desirable bait is based on all eight (or nine if fishing is to be done in a cove) of the environmental conditions shown in FIG. 1.

To determine the general fishing conditions which are indicated by the entered information, the computer element 26 determines a value for all the environmental identifiers selected. The sum of these values is evaluated against predetermined ranges to yield the general fishing condition.

To determine the preferable lure size, the computer element 26 uses the values for the environmental conditions of season, surface temperature and water clarity.

To determine the desirable lure shade of color, the values associated with the entered water depth, time of day, cover and water clarity environmental conditions are used.

The retrieval speed is based on the season, water temperature and water clarity conditions.

The size of line determination is made on the basis of the cover and water clarity input information.

The method of the present invention particularly comprises entering into the computer element a first electrical signal representing a season of the year, entering into the computer element a second electrical signal representing a range of surface temperatures of a body of water in which the fisherman is to fish, entering into the computer element a third electrical signal representing a range of depths of the body of water, entering into the computer element a fourth electrical signal representing a time of day during which fishing is to occur, entering into the computer element a fifth electrical signal representing a structure of the body of water where fishing is to occur, entering into the computer element a sixth electrical signal representing a cover associated with the body of water where fishing is to occur, entering into the computer element a seventh electrical signal representing a description of the clarity of the body of water, and entering into the computer element an eighth electrical signal representing a wind speed where the fishing is to occur. In response to these signals, the computer element computes a type of bait which is desirable for the fisherman to use when fishing under the entered conditions. The desirable bait is then communicated to the fisherman via the display 14.

The present invention is also utilized to compute in response to the first, second and seventh electrical signals a desirable size of the computed desirable bait.

The method further comprises computing in response to the third, fourth, sixth and seventh electrical signals a desirable shade of color of the computed desirable bait.

The method further comprises computing in response to the first, second and seventh electrical signals a desirable retrieval speed for retrieving the line to which the computed desirable bait is attached.

Still further, the method includes computing in response to the sixth and seventh electrical signals a desirable size of a line to which the computed desirable bait is attached.

When the fifth electrical signal representing the general environmental condition of structure specifies that the selected structure is a cove, the method further comprises entering into the computer element a ninth electrical signal representing a location in the cove. This ninth electrical signal is then also utilized by the computer element to compute the desirable bait.

When these various output factors have been computed, the bait indicator output 14 is appropriately actuated as are the appropriate ones of the light-emitting diodes 16a–16d, 18a–18c, 20a–20c, 22a–22c, and 24a–24c.

By way of example of the operation of the present invention, it will be assumed that a fisherman is going to fish for bass during the summer in water having a surface temperature of 76° F. and at a depth of 12 feet. The fishing is to be early in the day at the mouth of a cove. The surrounding cover is rocky, and the water is clear. There is no wind.

When the apparatus is energized through an on/off switch and power source (not shown), the program shown in FIGS. 3A–3F causes a prompt, such as the word "SEASON", to be displayed by the display means 14. In response to this prompt the fisherman depresses key 10b to generate a first electrical signal designating to the computer element 26 that the "summer" environmental identifier has been selected.

Once the seasonal choice has been stored, the prompt for the surface temperature is given. Because the temperature ranges contained on row 8b do not include the temperature 76° F., the fisherman depresses the key 10d to command the apparatus to pass to the next line of surface temperature identifiers. After a suitable prompt, the fisherman depresses key 10c to generate a second electrical signal indicating a temperature in the range 75° F. to 85° F.

After storage of the temperature choice, the apparatus prompts the fisherman to select the appropriate water depth. In the present example, the fisherman would depress key 10c to select the range 9 feet to 12 feet. Because a non-pass key on row 8d was depressed, the apparatus skips line 8e and prompts a time of day response.

By continuing in a similar manner, the fisherman enters the time of day and the remaining environmental conditions. For the given example, keys 10a, 10d, 10a, 10c, 10b, and 10a would be depressed in response to appropriate prompts to enter the remaining conditions.

Once all the conditions have been entered the accumulated values are determined as discussed hereinabove and the outputs 14-24 respectively actuated to communicate the desirable types and uses of equipment to the fisherman.

Thus, the present invention is well adapted to carry out the objects and attain the ends and advantages mentioned above as well as those inherent therein. While a preferred embodiment of the present invention has been provided for the purpose of this disclosure, numerous changes in the construction and arrangement of parts can be made by those skilled in the art which changes are encompassed within the spirit of this invention as defined by the appended claims.

What is claimed is:

1. A fishing aid, comprising:
   a housing;
   tubular means disposed on said housing, said tabular means including a plurality of columns of indicia defining a plurality of environmental conditions associated with fishing;
   a plurality of switch means for providing electrical signals designating selected portions of said indicia, said plurality of switch means being equal in number to said plurality of columns and each of said switch means being associated with a respective one of said columns;
   electronic computer means, having a data base including a plurality of types of fishing equipment and further including a preassigned value for each type of fishing equipment for each of said environmental conditions, for determining for each type of fishing equipment an accumulated value defined by the respective preassigned value associated with the respective environmental condition designated by each of said electrical signals and for comparing the accumulated value for each type of fishing equipment with the accumulated value for each other type of fishing equipment to automatically determine a desirable one of said types of fishing equipment, said computer means being disposed in said housing; and
   display means for communicating said desirable one of said types of fishing equipment.

2. An apparatus as defined in claim 1, wherein said indicia are arrayed in rows within said plurality of columns so that the indicia in each row define specific ranges within a respective one of said plurality of environmental conditions.

3. An apparatus as defined in claim 2, wherein said display means includes:
   means for specifying a preferred bait;
   means for specifying a preferred lure size;
   means for specifying a preferred shade of lure color;
   means for specifying a preferred fishing line size; and
   means for specifying a preferred line retrieval speed.

4. An apparatus as defined in claim 1, wherein said display means includes:
   means for specifying a preferred bait;
   means for specifying a preferred lure size;
   means for specifying a preferred shade of lure color;
   means for specifying a preferred fishing line size; and
   means for specifying a preferred line retrieval speed.

5. An apparatus for selecting a desirable fishing bait from a plurality of fishing baits, comprising:
   means for specifying a plurality of general environmental conditions affecting fish habitats, each of said general environmental conditions being defined to include a plurality of specific environmental identifiers;
   data entry means for selecting one of said specific environmental identifiers for each of said general environmental conditions;
   means for determining which specific environmental identifiers have been entered by said data entry means and for accumulating for each bait respective predetermined values corresponding to the entered specific environmental identifiers;
   comparison means for effectively comparing the accumulated value for each respective one of the plurality of fishing baits with the accumulated value for each other respective one of the plurality of fishing baits and for selecting the desirable fishing bait based upon the comparison; and
   display means, responsive to said comparison means, for displaying the desirable fishing bait.

6. An apparatus as defined in claim 5, wherein said general environmental conditions include a season during which the fishing bait is to be used, a temperature of the surface of a body of water in which the fishing bait is to be used, a depth of the body of water at which the fishing bait is to be used, a period of day during which the fishing bait is to be used, a structural formation of the body of water in which the fishing bait is to be used, a type of cover of the body of water in which the fishing bait is to be used, a clarity designation of the body of water in which the fishing bait is to be used, and a speed of a wind in which the fishing bait is to be used.

7. A bass fishing aid, comprising:
   data entry means for selecting a respective environmental identifier for each of a plurality of environmental conditions, said environmental conditions including:
   season, said season condition being identified by for season environmental identifiers;
   surface temperature, said surface temperature condition being defined by seven temperature environmental identifiers;
   water depth, said water depth condition being defined by seven depth environmental identifiers;
   time a day, said time of day condition being defined by four time environmental identifiers;
   structure, said structure condition being defined by four structure environmental identifiers;
   cove, said cove condition being defined by four cove environmental identifiers;
   cover, said cover condition being defined by four cover environmental identifiers;
   water clarity, said water clarity condition being defined by four water clarity environmental identifiers; and
   wind, said wind condition being defined by four wind environmental identifiers;
   computer means, responsive to said data entry means, for determining, based on respective preassigned values associated with each of the selected environmental identifiers, bait to be used for attempting to catch bass; and communication means for communicating the bait determined by said computer means.

8. An apparatus as defined in claim 7, wherein:
said four season environmental identifiers represent spring, summer, fall and winter;
said seven temperature environmental identifiers represent temperature ranges of approximately 35° F. to 44° F, 45° F to 50° F., 51° F. to 55° F., 56° F. to 64° F., 65° F. to 74° F., 75° F. to 85° F., and 86° F. and above;
said seven depth environmental identifiers represent depth ranges of approximately one foot to four feet, five feet to eight feet, nine feet to twelve feet, thirteen feet to eighteen feet, nineteen feet to twenty five feet, twenty-six feet to thirty-five feet, and thirty-six feet and greater;
said four time environmental identifiers represent early, mid-morning, mid-afternoon, and late;
said four structure environmental identifiers represent points, channels, slopes, and coves;
said four cove environmental identifiers represent the mouth of a cove, a cove channel, a flat cove, and the back of a cove;
said four cover environmental identifiers represent timber, brush, rocks, and weeds;
said four water clarity environmental identifiers represent extra-clear, clear, murky and dense; and
said four wind environmental identifiers represent calm, light, moderate, and strong.

9. An apparatus as defined in claim 8, wherein said computer means includes:
means for determining a desirable lure size from a plurality of lure sizes based on a lure size accumulated value of the respective preassigned values associated with the selected season environmental identifier, temperature environmental identifier, and water clarity environmental identifier for each of the plurality of lure sizes and a comparison of each lure size accumulated value with each other lure size accumulated value;
means for determining a desirable lure shade from a plurality of lure shades based on a lure shade accumulated value of the respective preassigned values associated with the selected depth environmental identifier, time of day environmental identifier, cover environmental identifier, and water clarity environmental identifier for each of the plurality of lure shades and a comparison of each lure shade accumulated value with each other lure shade accumulated value;
means for determining a desirable speed for retrieving a fishing line while attempting to catch bass from a plurality of speeds based on a speed accumulated value of the respective preassigned values associated with the selected season environmental identifier, temperature environmental identifier, and water clarity environmental identifier for each of the plurality of speeds and a comparison of each speed accumulated value with each other speed accumulated value; and
means for determining a desirable line size from a plurality of line sizes based on a line size accumulated value of the respective preassigned values associated with the selected cover environmental identifier and the water clarity environmental identifier for each of the plurality of line sizes and a comparison of each line size accumulated value with each other line size accumulated value.

10. An apparatus as defined in claim 9, wherein said communication means includes:
means for specifying a preferred bait;
means for specifying a preferred lure size;
means for specifying a preferred shade of lure color;
means for specifying a preferred fishing line size; and
means for specifying a preferred line retrieval speed.

11. An apparatus as defined in claim 7, wherein said computer means includes:
means for determining a desirable lure size from a plurality of lure sizes based on a lure size accumulated value of the respective preassigned values associated with the selected season environmental identifier, temperature environmental identifier, and water clarity environmental identifier for each of the plurality of lure sizes and a comparison of each lure size accumulated value with each other lure size accumulated value;
means for determining a desirable lure shade from a plurality of lure shades based on a lure shade accumulated value of the respective preassigned values associated with the selected depth environmental identifier, time of day environmental identifier, cover environmental identifier, and water clarity environmental identifier for each of the plurality of lure shades and a comparison of each lure shade accumulated value with each other lure shade accumulated value;
means for determining a desirable speed for retrieving a fishing line while attempting to catch bass from a plurality of speeds based on a speed accumulated value of the respective preassigned values associated with the selected season environmental identifier, temperature environmental identifier, and water clarity environmental identifier for each of the plurality of speeds and a comparison of each speed accumulated value with each other speed accumulated value; and
means for determining a desirable line size from a plurality of line sizes based on a line size accumulated value of the respective preassigned values associated with the selected cover environmental identifier and the water clarity environmental identifier for each of the plurality of line sizes and a comparison of each line size accumulated value with each other line size accumulated value.

12. An apparatus as defined in claim 11, wherein said communication means includes:
means for specifying a preferred bait;
means for specifying a preferred lure size;
means for specifying a preferred shade of lure color;
means for specifying a preferred fishing line size; and
means for specifying a preferred line retrieval speed.

13. A method of selecting from a plurality of baits a bait for use in attempting to catch fish, comprising:
defining a plurality of environmental identifiers for a plurality of environmental conditions forming criteria for selecting the bait;
assigning a respective numerical value to each bait for a respective environmental identifier;
selecting by data entry means a respective environmental identifier for each environmental condition;
accumulating for each bait, with computer means responsive to said data entry means, the numerical values assigned to that bait for the respective environmental identifiers selected;
determining with said computer means which bait has the desirable accumulated value; and communicating the bait determined to have the desirable accumulated value.

14. A method as defined in claim 13, wherein said step of defining a plurality of environmental identifiers includes:
specifying the environmental identifiers of a season environmental condition;
specifying the environmental identifiers of a surface temperature environmental condition;
specifying the environmental identifiers of a water depth environmental condition;
specifying the environmental identifiers of a time of day environmental condition;
specifying the environmental identifiers of a structure environmental condition;
specifying the environmental identifiers of a cover environmental condition;
specifying the environmental identifiers of a cover environmental condition;
specifying the environmental identifiers of a water clarity environmental condition; and
specifying the environmental identifiers of a wind speed environmental condition.

15. A method of assisting a person in selecting and utilizing fishing equipment to catch bass, comprising:
entering into a computer means a plurality of electrical signals designating environmental conditions under which the person is to try to catch bass;
analyzing with the computer means the entered electrical signals to determine a desirable bait, a desirable bait size, a desirable bait shade of color, a desirable fishing line size and a desirable line retrieval speed for the environmental conditions designated by the electrical signals, said step of analyzing including accumulating totals of respective preassigned values for each entered electrical signal for each of a plurality of baits, bait sizes, bait shades of color, fishing line sizes, and line retrieval speeds and comparing the accumulated totals for each of the plurality of baits, bait sizes, bait shades of color, fishing line sizes, and line retrieval speeds with the accumlated values for each other of the plurality of baits, bait sizes, bait shades of color, fishing line sizes, and line retrieval speeds, respectively;
communicating to the person the desirable bait;
communicating to the person the desirable bait size;
communicating to the person the desirable bait shade of color;
communicating to the person the desirable fishing line size; and
communicating to the person the desirable line retrieval speed.

16. A method as defined in claim 15, wherein the step of entering the electrical signals includes:
depressing one of a plurality of keys associated with the computer means to designate what reason it is;
depressing one of the plurality of keys to designate a temperature range which includes the surface temperature of the body of water in which the fishing is to occur;
depressing one of the plurality of keys to designate a depth range within which the fishing is to occur;
depressing one of the plurality of keys to designate the portion of the day during which the fishing is to occur;
depressing one of the plurality of keys to designate the structure in which the fishing is to occur;
depressing one of the plurality of keys to designate the cover in which the fishing is to occur;
depressing one of the plurality of keys to designate the clarity of the water in which the fishing is to occur; and
depressing one of the plurality of keys to designate the wind speed in which the fishing is to occur.

17. A method of aiding a fisherman, comprising:
entering into an electronic computer means a first electrical signal representing a season of the year;
entering into the computer means a second electrical signal representing a range of surface temperatures of a body of water in which the fisherman is to fish;
entering into the computer means a third electrical signal representing a range of depths of the body of water;
entering into the computer means a fourth electrical signal representing a time of day during which fishing is to occur;
entering into the computer means a fifth electrical signal representing a structure of the body of water where fishing is to occur;
entering into the computer means a sixth electrical signal representing a cover associated with the body of water where fishing is to occur;
entering into the computer means a seventh electrical signal representing a description of the clarity of the body of water;
entering onto the computer means an eighth electrical signal representing a wind speed where the fishing is to occur;
computing, in response to the first, second, third, fourth, fifth, sixth, seventh and eighth electrical signals, a plurality of accumulated values for a respective plurality of types of bait and preforming a comparison among the accumulated values to determine at least one of the types of bait which is desirable for the fisherman to use when fishing under the entered conditions; and
communicating to the fisherman the computed desired bait.

18. A method as defined in claim 17, further comprising:
determining, in response to the first, second, and seventh electrical signals, a desirable size of the computed desirable bait; and
communicating to the fisherman the determined desirable size.

19. A method as defined in claim 17, further comprising:
determining, in response to the third, fourth, sixth and seventh electrical signals, a desirable shade of color of the computed desirable bait; and
communicating to the fisherman the determined desirable shade.

20. A method as defined in claim 17, further comprising:
determining, in response to the first, second and seventh electrical signals, a desirable retrieval speed for retrieving a line to which the determined desirable bait is attached; and
communicating to the fisherman the determined desirable retrieval speed.

21. A method as defined in claim 17, further comprising:

determining, in response to the sixth and seventh electrical signals, a desirable size of a line to which the determined desirable bait is to be attached; and communicating to the fisherman the determined desirable line sizes.

22. A method as defined in claim 17, wherein:

said step of entering the fifth electrical signal includes specifying the fifth electrical signal to represent a point or a channel or a slope or a cove;

said method further comprises entering into the computer means a ninth electrical signal representing a location in the cove when the fifth electrical signal specifies a cove; and said step of computing the desirable bait is also performed in response to the ninth electrical signal.

* * * * *